US012746570B2

(12) United States Patent
Xu et al.

(10) Patent No.: US 12,746,570 B2
(45) Date of Patent: Sep. 29, 2026

(54) FEEDING APPARATUS AND SUBSTRATE PROCESSING DEVICE

(71) Applicant: CONTEMPORARY AMPEREX TECHNOLOGY CO., LIMITED, Ningde (CN)

(72) Inventors: Yongqiang Xu, Ningde (CN); Junna Shi, Ningde (CN); Yu Chen, Ningde (CN); Keqiang Li, Ningde (CN); Zhiyang Wu, Ningde (CN); Weifeng Chen, Ningde (CN); Jiabao Tang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 64 days.

(21) Appl. No.: 18/795,283

(22) Filed: Aug. 6, 2024

(65) Prior Publication Data

US 2024/0390936 A1 Nov. 28, 2024

Related U.S. Application Data

(63) Continuation of application No. PCT/CN2023/075915, filed on Feb. 14, 2023.

(30) Foreign Application Priority Data

Mar. 9, 2022 (CN) ........................ 202210231803.2

(51) Int. Cl.

*B65G 27/18* (2006.01)
*B05C 19/06* (2006.01)
(Continued)

(52) U.S. Cl.

CPC .............. *B05C 19/06* (2013.01); *B65G 27/18* (2013.01); *B65G 47/18* (2013.01); *H01M 4/0409* (2013.01)

(58) Field of Classification Search

CPC ...... B29C 2043/467; B29C 2043/3427; B29C 43/305; B29C 43/30; B29C 43/265; B29C 43/24; B29C 43/228; B65G 27/18
See application file for complete search history.

(56) References Cited

U.S. PATENT DOCUMENTS 1,190,168 A * 7/1916 Holly .................... B01F 27/112 222/196
2,187,717 A * 1/1940 Weyandt .................. B06B 3/00 318/132
(Continued)

FOREIGN PATENT DOCUMENTS

CN 1725529 A 1/2006
CN 101632972 A 1/2010
(Continued)

OTHER PUBLICATIONS

Extended European Search Report issued Dec. 11, 2024 in European Patent Application No. 23765736.6.
(Continued)

*Primary Examiner* — Matthew J Daniels
(74) *Attorney, Agent, or Firm* — XSENSUS LLP

(57) ABSTRACT

A feeding apparatus and a substrate processing device are provided. The feeding apparatus includes: a material conveying channel including a feeding inlet and a discharging outlet, where the feeding inlet is closer to a first end of the material conveying channel than the discharging outlet, and the discharging outlet is closer to a second end of the material conveying channel than the feeding inlet, the first end and the second end being two opposite ends of the material conveying channel; and a vibration generator disposed at the material conveying channel and configured to generate mechanical vibration to induce the mechanical vibration of the feeding apparatus, and a material entering the material conveying channel through the feeding inlet is
(Continued)

conveyed to the discharging outlet under the action of the mechanical vibration and falls out through the discharging outlet under the action of gravity.

16 Claims, 4 Drawing Sheets

(51) Int. Cl.

| | |
|---|---|
| ***B29C 43/46*** | (2006.01) |
| ***B65G 47/18*** | (2006.01) |
| ***H01M 4/04*** | (2006.01) |

(56) References Cited

U.S. PATENT DOCUMENTS

| | | | | |
|---|---|---|---|---|
| 4,128,162 | A * | 12/1978 | Winberg | B65G 27/04 248/220.1 |
| 6,610,445 | B1 * | 8/2003 | Moriwaki | H01M 4/30 429/218.2 |
| 2004/0107564 | A1 | 6/2004 | Kurimoto et al. | |
| 2016/0240847 | A1 * | 8/2016 | Kinoshita | B32B 37/24 |
| 2018/0193880 | A1 * | 7/2018 | Dumbaugh | B07B 1/42 |
| 2019/0100380 | A1 * | 4/2019 | Helfenstein | B65G 27/26 |

FOREIGN PATENT DOCUMENTS

| | | | |
|---|---|---|---|
| CN | 202807738 | U | 3/2013 |
| CN | 204668390 | U | 9/2015 |
| CN | 107323063 | A | 11/2017 |
| CN | 108645491 | A | 10/2018 |
| CN | 109075340 | A | 12/2018 |
| CN | 110328085 | A | 10/2019 |
| CN | 209491979 | U | 10/2019 |
| CN | 110880580 | A | 3/2020 |
| CN | 113102160 | A | 7/2021 |
| CN | 113102161 | A | 7/2021 |
| CN | 113102188 | A | 7/2021 |
| CN | 113118033 | A | 7/2021 |
| JP | 2013-062179 | A | 4/2013 |
| JP | 2013-062427 | A | 4/2013 |

OTHER PUBLICATIONS

First Examination Opinion Notice issued Aug. 8, 2025 in Chinese Patent Application No. 202210231803.2 with English translation thereof.

Communication pursuant to Article 94(3) EPC issued Jun. 3, 2025 in European Patent Application No. 23765736.6.

International Search Report and Written Opinion mailed on May 20, 2023, received for PCT Application PCT/CN2023/075915, filed on Feb. 14, 2023, 11 pages including English Translation.

Rejection Decision issued Jan. 28, 2026 in Chinese Application No. 202210231803.2 with English translation thereof.

Li Luhai at al., "Coating and Lamination Technology", Printing Industry Press, 1st Edition, Jun. 2011.

Office Action issued Nov. 3, 2025 in Chinese Patent Application No. 202210231803.2 with English translation thereof.

* cited by examiner

FEEDING APPARATUS AND SUBSTRATE PROCESSING DEVICE

CROSS-REFERENCE TO RELATED APPLICATIONS

This application is a continuation of International Application No. PCT/C N2023/075915, filed Feb. 14, 2023, which claims priority to Chinese Patent Application No. 202210231803.2, filed with the China National Intellectual Property Administration on Mar. 9, 2022 and entitled "FEEDING APPARATUS AND SUBSTRATE PROCESSING DEVICE", each of which is incorporated herein by reference in its entirety.

TECHNICAL FIELD

This application relates to the field of battery technologies and more specifically to a feeding apparatus and a substrate processing device.

BACKGROUND

Energy saving and emission reduction are crucial to the sustainable development of the automobile industry. Electric vehicles, with their advantages in energy conservation and environmental friendliness, have become an important part of the sustainable development of the automobile industry. For electric vehicles, battery technologies are an important factor related to the development of the electric vehicles.

Generally, a battery consists of a plurality of battery cells, and each battery cell includes an electrode assembly. The electrode assembly consists of a positive electrode plate and a negative electrode plate, and electrical energy is generated through migration of metal ions between the positive electrode plate and the negative electrode plate. During manufacturing of electrode plates, a feeding apparatus supplies a material for a coating process of a substrate, so that the substrate coated with the material becomes an electrode plate. Performance of the feeding apparatus directly affects quality of electrode plates. Therefore, how the performance of the feeding apparatus is improved has become a problem to be solved.

SUMMARY

Embodiments of this application provide a feeding apparatus and a substrate processing device, where the feeding apparatus has enhanced performance.

According to a first aspect, a feeding apparatus is provided, where the feeding apparatus is configured to supply a material for a coating process of a substrate, so that the substrate coated with the material becomes an electrode plate; and the feeding apparatus includes:

- a material conveying channel, where the material conveying channel includes a feeding inlet and a discharging outlet, the feeding inlet is closer to a first end of the material conveying channel than the discharging outlet, and the discharging outlet is closer to a second end of the material conveying channel than the feeding inlet, the first end and the second end being two opposite ends of the material conveying channel; and
- a vibration generator disposed at the material conveying channel, where the vibration generator is configured to generate mechanical vibration to induce the mechanical vibration of the feeding apparatus, and the material entering the material conveying channel through the feeding inlet is conveyed to the discharging outlet under the action of the mechanical vibration and falls out of the feeding apparatus through the discharging outlet under the action of gravity.

In the embodiments of this application, the feeding apparatus includes the feeding inlet, the discharging outlet, and the material conveying channel in communication with the feeding inlet and the discharging outlet, and the material conveying channel is connected to the vibration generator. The vibration generator drives the material conveying channel to generate mechanical vibration, so that the material entering the material conveying channel through the feeding inlet is conveyed to the discharging outlet and falls out of the feeding apparatus through the discharging outlet under the action of gravity. The feeding apparatus discharges the material through mechanical vibration and therefore can improve discharging consistency thereof and make the material fall more evenly. Compared with a feeding apparatus using an ultrasonic knife, this feeding apparatus has better performance and can obtain electrode plates with higher quality.

In an embodiment, an included angle between an amplitude direction of the mechanical vibration and the direction of gravity and an included angle between the amplitude direction of the mechanical vibration and a horizontal direction are both acute angles, where the horizontal direction is perpendicular to the direction of gravity, and the horizontal direction is from the first end to the second end.

In this embodiment, the amplitude direction of the material conveying channel is located between the direction of gravity and the horizontal direction, so that the material conveying channel can not only convey the material along the horizontal direction, but also make the material fall out of the feeding apparatus evenly when the material reaches the discharging outlet.

In an embodiment, a value range of the included angle between an amplitude direction of the mechanical vibration and the direction of gravity is [20°, 70° ]. For example, the included angle between the amplitude direction of the mechanical vibration and the direction of gravity is equal to 45°.

In an embodiment, the feeding apparatus further includes a hopper, where an outlet of the hopper is connected to the feeding inlet so that the material is added to the material conveying channel through the hopper. The hopper can store the material and supply it to the material conveying channel.

In an embodiment, the feeding apparatus further includes a baffle plate, where a thickness direction of the baffle plate is perpendicular to the direction of gravity, the baffle plate is disposed in a region around the discharging outlet of the material conveying channel, and the baffle plate is configured to block the material falling through the discharging outlet. The baffle plate can control the material in the horizontal direction and improve the falling uniformity of the material in a length direction of the substrate.

In an embodiment, the vibration generator is a pulse electromagnet.

In an embodiment, the material conveying channel is a cuboid, the feeding inlet is located at a third end of the material conveying channel, and the discharging outlet is located at a fourth end of the material conveying channel, where the third end and the fourth end are two opposite ends of the material conveying channel, and both the third end and the fourth end are configured to connect the first end and the second end.

In an embodiment, the material conveying channel is a cylinder, the first end and the second end are two bottom surfaces of the cylinder, and the feeding inlet and the discharging outlet are both located on a side surface of the cylinder.

According to a second aspect, a substrate processing device is provided, including: at least one feeding apparatus including the feeding apparatus according to any one of the first aspect or the embodiments of the first aspect; and at least one coating apparatus configured to apply a material supplied by the feeding apparatus onto a substrate.

In this embodiment, the feeding apparatus using mechanical vibration can improve falling consistency of the material and make the material fall more evenly. Compared with a feeding apparatus using an ultrasonic knife, the feeding apparatus using mechanical vibration has better performance. When applied to the coating process of the substrate, the feeding apparatus using mechanical vibration can make the material be applied more evenly onto a surface of the substrate, so as to obtain an electrode plate with higher quality.

In an embodiment, the at least one feeding apparatus includes a first feeding apparatus, where the first feeding apparatus is configured to drop the material onto a first surface of the substrate, the first surface being perpendicular to a thickness direction of the substrate. The at least one coating apparatus includes a first coating apparatus configured to apply the material dropped by the first feeding apparatus onto the first surface, where the material is used to form a first film material on the first surface.

The first feeding apparatus can cooperate with the first coating apparatus, and the first coating apparatus applies the material dropped by the first feeding apparatus onto the first surface of the substrate. The first feeding apparatus using mechanical vibration for discharging allows for more uniform falling amount of the material in a width direction of the substrate and better coating effect on the first surface of the substrate.

In an embodiment, the first coating apparatus includes: a first coating roller corresponding to a discharging outlet of the first feeding apparatus; and a second coating roller disposed opposite the first coating roller to apply the material dropped through the discharging outlet of the first feeding apparatus onto the first surface when the substrate passes between the first coating roller and the second coating roller, where the first surface faces toward the discharging outlet of the first feeding apparatus.

In this embodiment, the first coating apparatus has the first coating roller and the second coating roller disposed opposite each other, so that under extrusion of the first coating roller and the second coating roller, the material dropped by the first feeding apparatus is smoothed on the first surface of the substrate, so as to implement coating of the material on the first surface.

In an embodiment, the device further includes a first heating apparatus disposed downstream of the first coating apparatus, where the first heating apparatus is configured to heat up the material coated on the first surface, so as to obtain the first film material.

In this embodiment, the first heating apparatus can, for example, use infrared heating or hot oil medium heating to heat up the material coated on the first surface of the substrate, so that adhesion particles in the material melt, and then dry powder in the material is adhered together to form a flake coating with poor fluidity, that is, the first film material.

In an embodiment, the at least one feeding apparatus includes a second feeding apparatus, where the second feeding apparatus is configured to drop the material onto a roller surface of a first pressing roller. The at least one coating apparatus includes: a second coating apparatus configured to apply the material dropped by the second feeding apparatus onto the roller surface of the first pressing roller, where the material is used to form a second film material on the roller surface of the first pressing roller; and a rolling apparatus disposed downstream of the second coating apparatus, where the rolling apparatus includes the first pressing roller and a second pressing roller disposed opposite each other. The rolling apparatus is configured to: when the substrate passes between the first pressing roller and the second pressing roller, transfer the second film material from the roller surface of the first pressing roller and press-fit the second film material onto a second surface of the substrate under a pressure between the first pressing roller and the second pressing roller, where the second surface is perpendicular to a thickness direction of the substrate and disposed opposite a first surface, the first surface faces toward a roller surface of the second pressing roller, and the second surface faces away from the roller surface of the second pressing roller.

In this embodiment, the second feeding apparatus can cooperate with the second coating apparatus and the rolling apparatus, so that the material dropped by the second feeding apparatus is applied onto the roller surface of the first pressing roller in the rolling apparatus by the second coating apparatus to form the second film material. When the substrate passes between the first pressing roller and the second pressing roller, due to a difference in adhesion forces of the roller surface and substrate against the film material, the second film material is transferred from the roller surface of the first pressing roller and press-fitted to the second surface of the substrate under the pressure between the first pressing roller and the second pressing roller. The second feeding apparatus using mechanical vibration for discharging allows for more uniform falling amount of the material in a width direction of the roller surface and ultimately better coating effect on the second surface of the substrate.

In an embodiment, the rolling apparatus is configured to convey the substrate to between the first pressing roller and the second pressing roller using the second pressing roller, thereby simplifying a roller system structure.

In an embodiment, the device further includes a second heating apparatus configured to heat up the material coated on the roller surface of the first pressing roller, so as to obtain the second film material.

In this embodiment, the second heating apparatus can, for example, use infrared heating or hot oil medium heating to heat up the material coated on the roller surface of the first pressing roller, so that adhesion particles in the material melt, and then dry powder in the material is adhered together to form a flake coating with poor fluidity, that is, the second film material.

In an embodiment, the second heating apparatus includes a plurality of heating pipes arranged in an arc shape around the roller surface of the first pressing roller. The heating pipes being arranged in an arc shape around the roller surface of the first pressing roller can allow for uniform heating for the roller surface of the first pressing roller, thus improving uniformity of the first film material and guaranteeing consistency of finished products.

In an embodiment, the second coating apparatus includes a third coating roller corresponding to a discharging outlet of the second feeding apparatus and disposed opposite the first pressing roller to apply the material dropped through the discharging outlet of the second feeding apparatus onto the roller surface of the first pressing roller when the first pressing roller and the third coating roller rotate relative to each other.

In this embodiment, the second coating apparatus has the third coating roller and the first pressing roller disposed opposite each other, so that under extrusion of the third coating roller and the first pressing roller, the material dropped by the second feeding apparatus is smoothed on the roller surface of the first pressing roller, so as to implement coating of the material on the roller surface of the first pressing roller.

In an embodiment, the rolling apparatus is disposed downstream of the first coating apparatus, and the rolling apparatus is further configured to: when the substrate passes between the first pressing roller and the second pressing roller, press-fit the first film material onto the first surface under the pressure between the first pressing roller and the second pressing roller.

In this embodiment, when the substrate passes between the first pressing roller and the second pressing roller, the first film material previously coated on the first surface of the substrate is press-fitted to the first surface under the pressure between the first pressing roller and the second pressing roller, while the second film material previously coated on the roller surface of the first pressing roller is transferred to the second surface of the substrate and then press-fitted to the second surface of the substrate under the pressure between the first pressing roller and the second pressing roller. Because the first film material and the second film material are press-fitted to the first surface and second surface of the substrate at the same time, there is no need to wind and unwind repeatedly in the entire substrate processing, reducing complexity of the device, and the first surface and second surface of the substrate are subject to even pressure, reducing problems such as cracking caused by uneven stress and improving quality of finished products.

In an embodiment, the device further includes: an unwinding roller configured to release the substrate that is not processed; a traction roller disposed between the first coating apparatus and the unwinding roller and configured to provide traction for conveying the substrate; a winding roller configured to wind the substrate processed by the rolling apparatus; and a tension roller disposed between the first coating apparatus and the unwinding roller and configured to measure tension of the substrate in a conveying process, where the tension is used for adjusting a rotation speed of at least one of the unwinding roller, the winding roller, and the traction roller.

In this embodiment, the tension of the substrate in the conveying process is measured using the tension roller, so that the rotation speeds of the unwinding roller, the winding roller, the traction roller, and the like can be adjusted based on the magnitude of the tension of the substrate fed back by the tension roller, thus ensuring smooth conveying of the substrate, ensuring stable coating and rolling processes for the substrate, and improving the quality of finished products.

According to a third aspect, a substrate processing method is provided and applied to a substrate processing device, where the device includes at least one feeding apparatus and at least one coating apparatus. The method includes: supplying, by at least one feeding apparatus, a material to at least one coating apparatus; and applying, by the at least one coating apparatus, the material onto a substrate.

DESCRIPTION OF EMBODIMENTS

Figure 1:
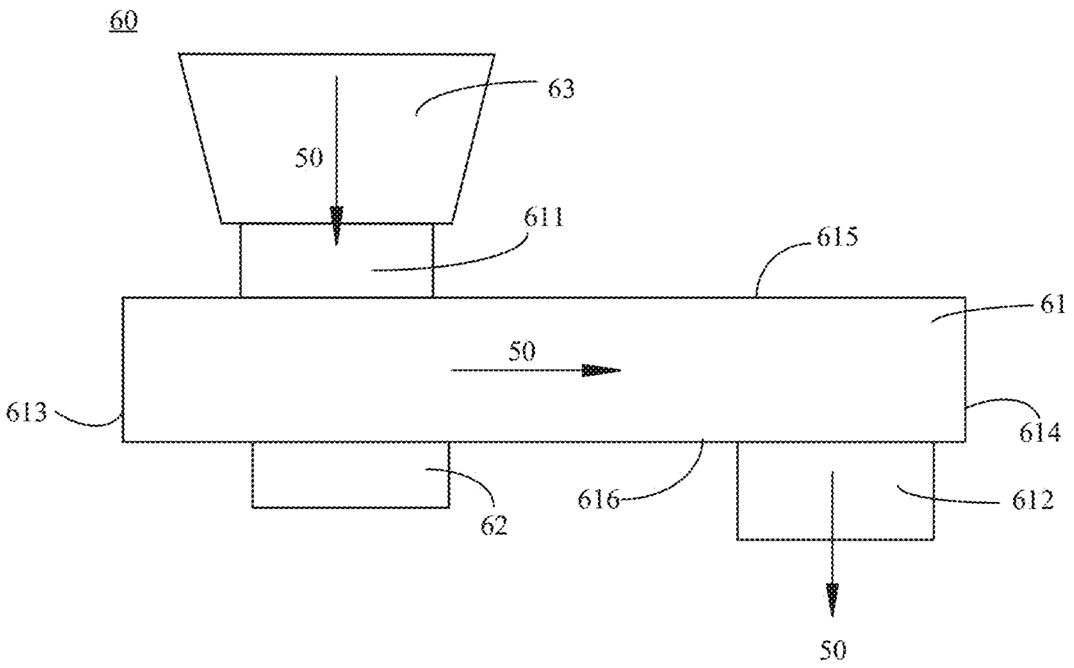
FIG. 1 is a schematic diagram of a feeding apparatus according to an embodiment of this application.

The following describes the technical solutions in the embodiments of this application with reference to the accompanying drawings.

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance. "Perpendicular" is not perpendicular in the strict sense but within an allowable range of error. "Parallel" is not parallel in the strict sense but within an allowable range of error.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of this application, it should be noted that unless otherwise specified and defined explicitly, the terms "mounting", "connection", "join", and "attachment" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A;

presence of both A and B; and presence of only B. In addition, the character "/" in this application generally indicates an "or" relationship between contextually associated objects.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "a plurality of" means two or more. Similarly, "a plurality of groups" means two or more groups, and "a plurality of pieces" means two or more pieces.

In the automobile industry environment in which conventional energy sources are used for power supply, environmental pollution problem is increasingly serious, so the active development of new energy vehicles can reduce the harm to the environment. For new energy vehicles, battery technologies are an important factor related to the development of the new energy vehicles.

The battery mentioned in this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

In an embodiment, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. Generally, the battery cell may also be referred to as a cell. The battery cell may be cylindrical, flat, cuboid, or of other regular or irregular shapes. The technical solutions in the embodiments of this application may be applied to battery cells of any shape.

The battery cell includes an electrode assembly and an electrolyte. The electrode assembly includes a positive electrode plate, a negative electrode plate, and a separator. The battery cell functions mainly relying on migration of metal ions between the positive electrode plate and the negative electrode plate. The positive electrode plate includes a positive electrode current collector and a positive electrode active substance layer. The positive electrode active substance layer is applied on a surface of the positive electrode current collector, and a current collector uncoated with the positive electrode active substance layer protrudes from the current collector coated with the positive electrode active substance layer and serves as a positive electrode tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector, and a current collector uncoated with the negative electrode active substance layer protrudes from the current collector coated with the negative electrode active substance layer and serves as a negative electrode tab. The negative electrode current collector may be made of copper, and the negative electrode active substance may be carbon, silicon, or the like. To allow a large current to pass through without any fusing, multiple positive electrode tabs are provided and stacked together, and multiple negative electrode tabs are provided and stacked together. The separator may be made of polypropylene (Polypropylene, PP), polyethylene (Polyethylene, PE), or the like. In addition, the electrode assembly may be a wound structure or a stacked structure, but the embodiments of this application are not limited thereto.

As mentioned above, both the surfaces of the positive electrode plate and the negative electrode plate are coated with active substance layers. During manufacturing of the electrode plate, an important procedure is to apply the active substance to the surface of the substrate, so as to obtain the positive electrode plate or negative electrode plate. In the coating process, corresponding materials are supplied by a feeding apparatus, so performance of the feeding apparatus directly affects quality of the electrode plates.

FIG. 1 shows a feeding apparatus according to an embodiment of this application. As shown in FIG. 1, the feeding apparatus 60 is configured to supply a material 50 for a coating process of a substrate 40 so that the substrate 40 coated with the material becomes an electrode plate; and the feeding apparatus 60 includes a material conveying channel 61 and a vibration generator 62.

The material conveying channel 61 includes a feeding inlet 611 and a discharging outlet 612, where the feeding inlet 611 is closer to a first end 613 of the material conveying channel 61 than the discharging outlet 612, and the discharging outlet 612 is closer to a second end 614 of the material conveying channel 61 than the feeding inlet 611, the first end 613 and the second end 614 being two opposite ends of the material conveying channel 61.

The vibration generator 62 is disposed at the material conveying channel 61, and the vibration generator 62 is configured to generate mechanical vibration to induce the mechanical vibration of the feeding apparatus 60. The material 50 entering the material conveying channel 61 through the feeding inlet 611 is conveyed to the discharging outlet 612 under the action of the mechanical vibration and falls out of the feeding apparatus 60 through the discharging outlet 612 under the action of gravity. The vibration generator 62 may be, for example, a pulse electromagnet, and is disposed below the material conveying channel 61. The pulse electromagnet makes the material conveying channel 61 generate mechanical vibration in an oblique direction through high-frequency opening and closing, and an included angle between an amplitude direction F of the mechanical vibration and the direction of gravity G and an included angle between the amplitude direction F of the mechanical vibration and a horizontal direction H are both acute angles. The vibrating generator 62 may alternatively be a mechanism in other forms that can cause the material conveying channel to vibrate. This is not limited in this application.

In this embodiment of this application, the feeding apparatus 60 includes the feeding inlet 611, the discharging outlet 612, and the material conveying channel 61 in communication with the feeding inlet 611 and the discharging outlet 612, and the material conveying channel 61 is connected to the vibration generator 62. The vibration generator 62 drives the material conveying channel 61 to generate mechanical vibration, so that the material 50 entering the material conveying channel 61 through the feeding inlet 611 is conveyed to the discharging outlet 612 and falls out of the feeding apparatus 60 through the discharging outlet 612 under the action of gravity. The feeding apparatus 60 discharges the material 50 through mechanical vibration, and therefore can improve discharging consistency thereof and make the material 50 fall more evenly. Compared with a feeding apparatus using an ultrasonic knife, the feeding apparatus 60 has better performance and can obtain electrode plates with higher quality.

In an embodiment, an included angle between an amplitude direction F of the mechanical vibration and the direction of gravity G and an included angle between the amplitude direction F of the mechanical vibration and a horizontal direction H are both acute angles.

The horizontal direction H is perpendicular to the direction of gravity G, and the horizontal direction H is from the first end 613 of the material conveying channel 61 to the second end 614 of the material conveying channel 61.

The amplitude direction F of the material conveying channel 61 is located between the direction of gravity G and the horizontal direction H, so that the material conveying channel 61 can not only convey the material 50 along the horizontal direction H, but also make the material 50 fall out of the feeding apparatus 61 evenly when the material 50 reaches the discharging outlet 612.

A value range of the included angle between the amplitude direction F of the mechanical vibration and the direction of gravity may be, for example, [20°, 70°]. For example, the included angle between the amplitude direction F of the mechanical vibration and the direction of gravity G and the included angle between the amplitude direction F of the mechanical vibration and the horizontal direction H are both 45°.

Figure 2:
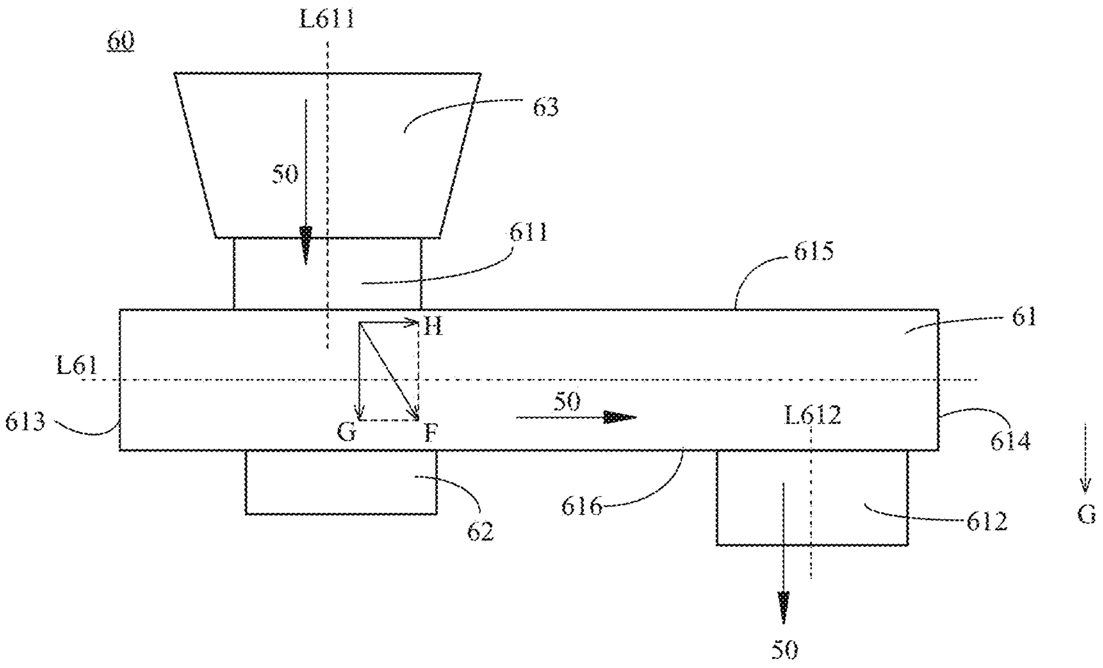
FIG. 2 is a schematic diagram of a feeding apparatus according to another embodiment of this application.

For example, as shown in FIG. 2, the discharging outlet 612 faces downward in the direction of gravity G, and a direction of the feeding inlet 611 is opposite to a direction of the discharging outlet 612. An axis L611 of the feeding inlet 611 is perpendicular to an axis L61 of the material conveying channel 61, an axis L612 of the discharging outlet 612 is perpendicular to the axis L61 of the material conveying channel 61, and the axis L611 of the feeding inlet 611 is parallel to the axis L612 of the discharging outlet 612. The amplitude direction F is located between the direction of gravity G and the horizontal direction H, and the material conveying channel 61 vibrates along the amplitude direction F, thus exerting a force on the material 50 in the amplitude direction F, so that the material 50 can be conveyed from the feeding inlet 611 to the discharging outlet 612 along the horizontal direction H and fall out of the feeding apparatus 60 through the discharging outlet 612 under the action of gravity.

Vibration intensity and vibration frequency of the vibration generator 62 may affect the discharging amount of the feeding apparatus 60. The falling amount of the material 50 can be adjusted by adjusting the vibration intensity, the vibration frequency, and the like, so that thickness, weight, and the like of electrode plates fall within ideal ranges. For example, the vibration frequency may be set to be less than or equal to 500 Hz, such as 50 Hz. For another example, the vibration intensity may be set to satisfy that the amplitude is less than or equal to 2.4 mm.

The feeding apparatus 60 discharges the material 50 based on mechanical vibration, and therefore can improve falling consistency of the material 50, especially falling consistency of the material 50 in the width direction of the substrate or the width direction of the roller surface, so as to obtain electrode plates with uniform thickness and flat surface. Generally, in the process of applying the material onto the surface of the substrate 40, the substrate 40 moves along the horizontal direction H, and the width direction of the substrate 40 is perpendicular to the horizontal direction H and the direction of gravity G.

In an embodiment, as shown in FIG. 1 and FIG. 2, the feeding apparatus 60 further includes a hopper 63, where an outlet of the hopper 63 is connected to the feeding inlet 611 of the material conveying channel 61 so that the material 50 is added to the material conveying channel 61 through the hopper 63. The hopper 63 can store the material and supply it to the material conveying channel 61, and capacity of the hopper 63 can be set according to actual requirements.

Figure 3:
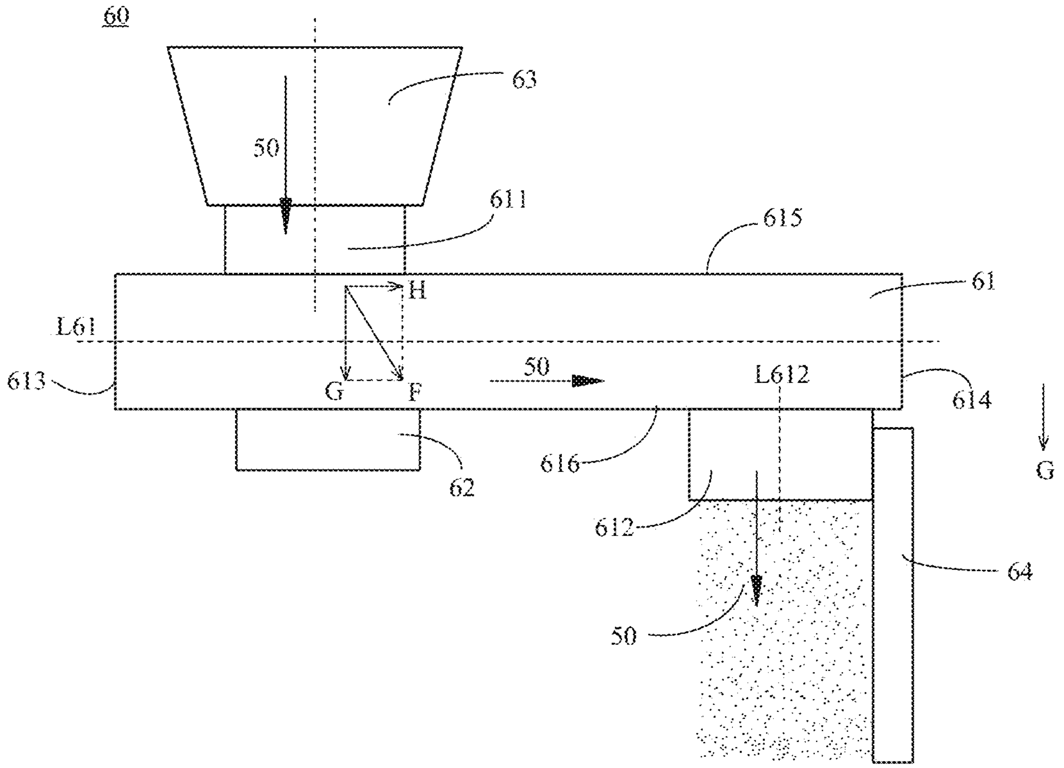
FIG. 3 is a schematic diagram of a feeding apparatus according to still another embodiment of this application.

In an embodiment, as shown in FIG. 3, the feeding apparatus 60 further includes a baffle plate 64, where a thickness direction of the baffle plate 64 is perpendicular to the direction of gravity G, the baffle plate 64 is disposed in a region around the discharging outlet 612 of the material conveying channel 61, and the baffle plate 64 is configured to block the material 50 falling through the discharging outlet 612. The baffle plate 64 can control the material 50 in the horizontal direction H and therefore improves falling uniformity of the material 50 in a length direction of the substrate 40.

A form of the material conveying channel 61 is not limited in this application. In an embodiment, the material conveying channel 61 may be a cuboid, the feeding inlet 611 is located at a third end 615 of the material conveying channel 61, and the discharging outlet 612 is located at a fourth end 616 of the material conveying channel 61. As shown in FIG. 1 to FIG. 3, the third end 615 and the fourth end 616 are two opposite ends of the material conveying channel 61, and both the third end 615 and the fourth end 616 are configured to connect the first end 613 and the second end 614.

For example, the cuboid may be a hollow structure with a cavity in the horizontal direction H, and the feeding inlet 611 and the discharging outlet 612 are in communication with the cavity, so that the material 50 is conveyed from the feeding inlet 611 to the discharging outlet 612 through the cavity under the action of the mechanical vibration and falls through the discharging outlet 612.

For another example, the cuboid may alternatively be a flat plate, and the feeding inlet 611 and the discharging outlet 612 penetrate the flat plate in the direction of gravity G, so that the material 50 is conveyed from the feeding inlet 611 to the discharging outlet 612 along an upper surface of the flat plate under the action of the mechanical vibration and falls through the discharging outlet 612. Alternatively, the discharging outlet 612 may not be provided, instead, the material 50 is conveyed from the feeding inlet 611 along the upper surface of the flat plate to an edge of the flat plate close to the second end 614, so that when reaching the edge of the flat plate, the material 50 naturally falls off.

In another embodiment, the material conveying channel 61 is a cylinder, the first end 613 and the second end 614 are two bottom surfaces of the cylinder, and the feeding inlet 611 and the discharging outlet 612 are both located on a side surface of the cylinder.

For example, the cylinder may be a hollow structure with a cavity in the horizontal direction H, and the feeding inlet 611 and the discharging outlet 612 are in communication with the cavity, so that the material 50 is conveyed from the feeding inlet 611 to the discharging outlet 612 through the cavity and falls through the discharging outlet 612.

The foregoing feeding apparatus 60 can be applied to a substrate processing device, and the substrate processing device applies a material supplied by the feeding apparatus 60 onto a surface of a substrate to obtain an electrode plate.

Figure 4:
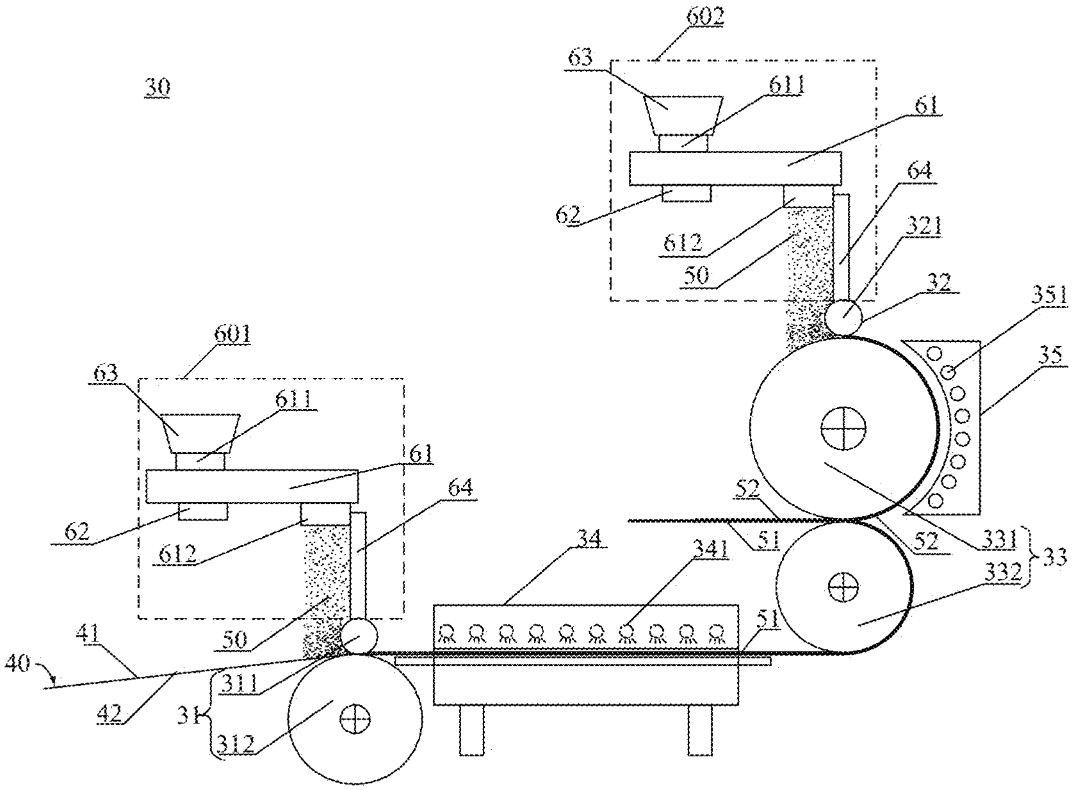
FIG. 4 is a schematic diagram of a substrate processing device according to an embodiment of this application.
Figure 5:
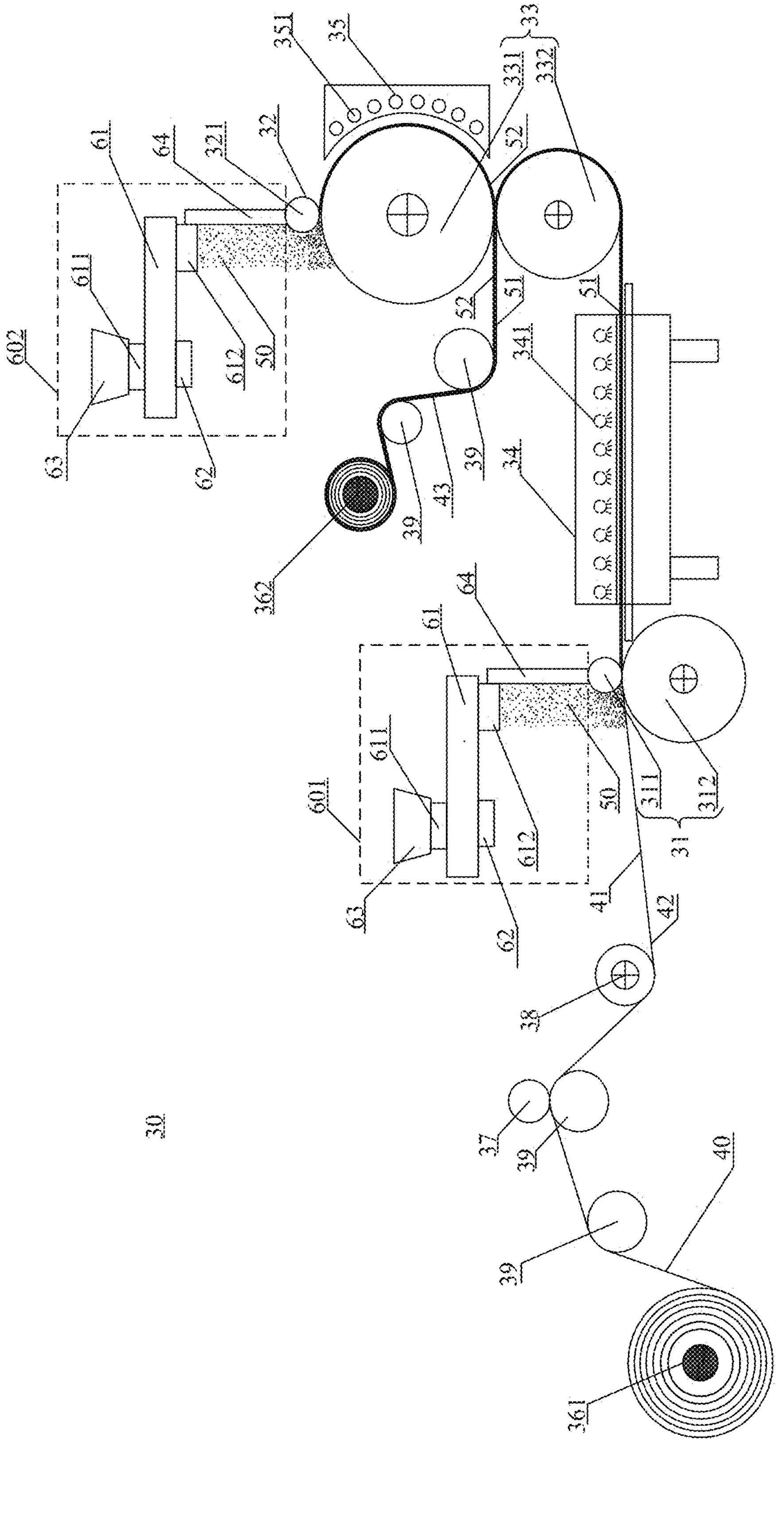
FIG. 5 is a schematic diagram of a substrate processing device according to another embodiment of this application.

The following describes a substrate processing device provided in the embodiments of this application with reference to FIG. 4 and FIG. 5.

FIG. 4 shows a substrate processing device according to an embodiment of this application. As shown in FIG. 4, the substrate processing device 30 includes at least one feeding apparatus and at least one coating apparatus, where the at least one feeding apparatus includes, for example, the feeding apparatus 60 according to any of the foregoing embodiments of this application. The at least one coating apparatus is configured to apply a material 50 supplied by the feeding apparatus onto a substrate 40.

The feeding apparatus using mechanical vibration can improve falling consistency of the material and make the material fall more evenly. Compared with a feeding apparatus using an ultrasonic knife, the feeding apparatus using mechanical vibration has better performance. When applied to the coating process of the substrate, the feeding apparatus using mechanical vibration can make the material be applied more evenly onto a surface of the substrate, so as to obtain an electrode plate with higher quality.

In an embodiment, the at least one feeding apparatus 60 includes a first feeding apparatus 601, where the first feeding apparatus 601 is configured to drop the material 50 onto a first surface 41 of the substrate 40, the first surface 41 being perpendicular to a thickness direction of the substrate 40.

Correspondingly, the at least one coating apparatus may include a first coating apparatus 31, where the first coating apparatus 31 is configured to apply the material 50 dropped by the first feeding apparatus 601 onto the first surface 41, and the material is used to form a first film material 51 on the first surface 41.

The first feeding apparatus 601 is used in cooperation with the first coating apparatus 31, and the first coating apparatus 31 applies the material 50 dropped by the first feeding apparatus 601 onto the first surface 41 of the substrate 40. The first feeding apparatus 601 using mechanical vibration for discharging allows for more uniform falling amount of the material 50 in a width direction of the substrate 40 and better coating effect on the first surface 41 of the substrate 40.

As shown in FIG. 4, the first coating apparatus 31 may include, for example, a first coating roller 311 and a second coating roller 312. The first coating roller 311 corresponds to a discharging outlet 612 of the first feeding apparatus 601, for example, being located near the discharging outlet 612 of the first feeding apparatus 601 or near a baffle plate 64 of the first feeding apparatus 601. The second coating roller 312 is disposed opposite the first coating roller 311 to apply the material 50 dropped through the discharging outlet 612 of the first feeding apparatus 601 onto the first surface 41 of the substrate 40 when the substrate 40 passes between the first coating roller 311 and the second coating roller 312. The first surface 41 faces toward the discharging outlet of the first feeding apparatus 601.

Under extrusion of the first coating roller 311 and the second coating roller 312, the material 50 dropped by the first feeding apparatus 601 can be smoothed on the first surface 41 of the substrate 40, so as to implement coating of the material 50 on the first surface 41.

In an embodiment, the substrate processing device 30 further includes a first heating apparatus 34. As shown in FIG. 4, the first heating apparatus 34 is disposed downstream of the first coating apparatus 31, and the first heating apparatus 34 is configured to heat up the material 50 coated on the first surface 41, so as to obtain the first film material 51.

The first heating apparatus 34 can, for example, use infrared heating or hot oil medium heating to heat up the material 50 coated on the first surface 41 of the substrate 40, so that adhesion particles in the material 50 melt, and then dry powder in the material 50 is adhered together to form a flake coating with poor fluidity, that is, the first film material 51.

For example, as shown in FIG. 4, the first heating apparatus 34 includes a plurality of heating pipes, where the heating pipes are disposed on a side of the first surface 41 of the substrate 40. When the substrate 40 is conveyed from the first coating apparatus 31 to the first heating apparatus 34, the plurality of heating pipes heat up the material 50 coated on the first surface 41 of the substrate 40, so that the material 50 forms the first film material 51.

In an embodiment, the at least one feeding apparatus includes a second feeding apparatus 602, where the second feeding apparatus 602 is configured to drop the material 50 onto a roller surface of a first pressing roller 331.

Correspondingly, the at least one coating apparatus includes a second coating apparatus 32 and a rolling apparatus 33. The second coating apparatus 32 is configured to apply the material 50 dropped by the second feeding apparatus 602 onto the roller surface of the first pressing roller 331. The material 50 is used to form a second film material 52 on the roller surface of the first pressing roller 331.

The rolling apparatus 33 is disposed downstream of the second coating apparatus 32, the rolling apparatus 33 includes the first pressing roller 331 and a second pressing roller 332 disposed opposite each other, and the rolling apparatus 33 is configured to: when the substrate 40 passes between the first pressing roller 331 and the second pressing roller 332, transfer the second film material 52 from the roller surface of the first pressing roller 331 and press-fit the second film material 52 onto a second surface 42 of the substrate 40 under a pressure between the first pressing roller 331 and the second pressing roller 332. The second surface 42 is perpendicular to a thickness direction of the substrate and disposed opposite the first surface 41, the first surface 41 faces toward a roller surface of the second pressing roller 332, and the second surface 42 faces away from the roller surface of the second pressing roller 332.

The at least one coating apparatus may include the first coating apparatus 31, include the second coating apparatus 32 and the rolling apparatus 33, or include the first coating apparatus 31, the second coating apparatus 32, and the rolling apparatus 33. The first feeding apparatus 601 is configured to supply a material to the first coating apparatus 31, and the second feeding apparatus 602 is configured to supply a material to the second coating apparatus 32.

As shown in FIG. 4, when the second feeding apparatus 602 is used in cooperation with the second coating apparatus 32 and the rolling apparatus 33, the material 50 dropped by the second feeding apparatus 602 is applied onto the roller surface of the first pressing roller 331 in the rolling apparatus 33 by the second coating apparatus 32 to form the second film material 52. When the substrate 40 passes between the first pressing roller 331 and the second pressing roller 332, due to a difference in adhesion forces of the roller surface and substrate 40 against the film material, the second film material 52 is transferred from the roller surface of the first pressing roller 331 and press-fitted to the second surface 42 of the substrate 40 under the pressure between the first pressing roller 331 and the second pressing roller 332. The second feeding apparatus 602 using mechanical vibration for discharging allows for more uniform falling amount of the material 50 in a width direction of the roller surface and ultimately better coating effect on the second surface 42 of the substrate 40.

The second coating apparatus 32 may include, for example, a third coating roller 321. The third coating roller 321 corresponds to a discharging outlet of the second feeding apparatus 602 and disposed opposite the first pressing roller 331 to apply the material 50 dropped through the discharging outlet of the second feeding apparatus 602 onto the roller surface of the first pressing roller 331 when the first pressing roller 331 and the third coating roller 321 rotate relative to each other. In this way, the material 50 dropped by the second feeding apparatus 602 can be evenly applied onto the roller surface of the first pressing roller 331 using the third coating roller 321 and the first pressing roller 331 disposed opposite each other.

In an embodiment, as shown in FIG. 4, the rolling apparatus 33 is configured to convey the substrate 40 to between the first pressing roller 331 and the second pressing roller 332 using the second pressing roller 332, thereby simplifying a roller system structure. The first surface 41 of the substrate 40 faces toward the roller surface of the second pressing roller 332, and the second surface 42 of the substrate 40 faces away from the roller surface of the second pressing roller 332. In this way, when the substrate 40 passes between the first pressing roller 331 and the second pressing roller 332, the second surface 42 of the substrate 40 faces toward the roller surface of the first pressing roller 331, and the second film material 52 is transferred from the roller surface of the first pressing roller and press-fitted to the second surface 42 of the substrate 40 under the pressure between the first pressing roller 331 and the second pressing roller 332.

In an embodiment, as shown in FIG. 4, the substrate processing device 30 further includes a second heating apparatus 35. The second heating apparatus 35 is configured to heat up the material 50 coated on the roller surface of the first pressing roller 331, so as to obtain the second film material 52.

The second heating apparatus 35 can, for example, use infrared heating or hot oil medium heating to heat up the material 50 coated on the roller surface of the first pressing roller 331, so that adhesion particles in the material 50 melt, and then dry powder in the material 50 is adhered together to form a flake coating with poor fluidity, that is, the second film material 52.

For example, as shown in FIG. 4, the second heating apparatus 35 includes a plurality of heating pipes arranged in an arc shape around the roller surface of the first pressing roller 331. The plurality of heating pipes being arranged in an arc shape around the roller surface of the first pressing roller 331 can allow for uniform heating for the roller surface of the first pressing roller 331, thus improving uniformity of the first film material 51 and guaranteeing consistency of finished products.

In an embodiment, the rolling apparatus 33 is disposed downstream of the first coating apparatus 31, and the rolling apparatus 33 is further configured to: when the substrate 40 passes between the first pressing roller 331 and the second pressing roller 332, press-fit the first film material 51 onto the first surface 41 under the pressure between the first pressing roller 331 and the second pressing roller 332.

In this way, when the substrate 40 passes between the first pressing roller 331 and the second pressing roller 332, the first film material 51 previously coated on the first surface 41 of the substrate 40 is press-fitted to the first surface 41 under the pressure between the first pressing roller 331 and the second pressing roller 332, while the second film material 52 previously coated on the roller surface of the first pressing roller 331 is transferred to the second surface of the substrate 40 and then press-fitted to the second surface 42 of the substrate 40 under the pressure between the first pressing roller 331 and the second pressing roller 332. Because the first film material 51 and the second film material 52 are press-fitted to the first surface 41 and second surface 42 of the substrate 40 at the same time, there is no need to wind and unwind repeatedly in the entire substrate processing, reducing complexity of the device, and the first surface 41 and second surface 42 of the substrate 40 are subject to even pressure, reducing problems such as cracking caused by uneven stress and improving quality of finished products.

Specifically, after the first surface 41 of the substrate 40 passes through the first coating apparatus 31, the material 50 is applied onto the first surface 41; then the substrate 40 is conveyed to the first heating apparatus 34, and the material coated on the first surface 41 is heated by the first heating apparatus 34 to form the first film material 51 on the first surface 41, where the first surface 41 of the substrate 40 faces toward the roller surface of the second pressing roller 332; and when the substrate 40 passes through the second pressing roller 332 and reaches between the first pressing roller 331 and the second pressing roller 332, the first film material 51 is press-fitted to the first surface 41 under the pressure between the first pressing roller 331 and the second pressing roller 332. It can be understood that before the substrate 40 reaches the rolling apparatus 33, the material 50 is just spread or pre-pressed on the first surface 41 of the substrate 40, and only after the substrate 40 passes through the rolling apparatus 33, the material 50 is firmly press-fitted on the first surface 41, thus obtaining a finished product with satisfactory quality.

After the second surface 42 of the substrate 40 passes through the second coating apparatus 32, the material 50 is applied onto the roller surface of the first pressing roller 331, and after heated by the second heating apparatus 34, forms the second film material 52 on the roller surface of the first pressing roller 331, where the second surface 42 of the substrate 40 faces toward the roller surface of the first pressing roller 331; and then with the rotation of the first pressing roller 331, the second film material 52 on the roller surface of the first pressing roller 331 is conveyed to between the first pressing roller 331 and the second pressing roller 332, and the second film material 52 is press-fitted on the second surface 42 of the substrate 40 under the pressure between the first pressing roller 331 and the second pressing roller 332. It can be understood that before the second film material 52 reaches between the first pressing roller 331 and the second pressing roller 332, the material 50 is just spread or pre-pressed on the roller surface of the first pressing roller 331; and after the second film material 52 passes between the first pressing roller 331 and the second pressing roller 332, due to a difference in adhesion forces of the roller surface and substrate against the material 50, when the substrate 40 and the second film material 52 pass between the first pressing roller 331 and the second pressing roller 332 at the same time, the material 50 is transferred from the roller surface of the first pressing roller 331 to the second surface 42 of the substrate 40, and the second film material 52 is firmly press-fitted on the second surface 42 under the pressure between the first pressing roller 331 and the second pressing roller 332, thus obtaining a finished product with satisfactory quality.

In some embodiments, as shown in FIG. 5, the substrate processing device 30 may further include other rollers, so as to form a complete roller system.

For example, as shown in FIG. 5, the device 30 further includes an unwinding roller 361 and a winding roller 362. The unwinding roller 361 is configured to release the substrate 40 that is not processed, and the winding roller 362 is configured to wind the substrate 40 processed by the rolling apparatus 33.

For another example, as shown in FIG. 5, the device 30 further includes a traction roller 37. The traction roller 37 is disposed between the first coating apparatus 31 and the unwinding roller 361 and configured to provide traction for conveying the substrate 40.

For still another example, as shown in FIG. 5, the device 30 further includes a tension roller 38. The tension roller 38 is disposed between the first coating apparatus 31 and the unwinding roller 361 and configured to measure tension of the substrate 40 in a conveying process. The tension may be used for adjusting a rotation speed of at least one of the unwinding roller 361, the winding roller 362, and the traction roller 37.

The tension of the substrate 40 in the conveying process is measured using the tension roller 38, so that parameters such as the rotation speeds of the unwinding roller 361, the winding roller 362, the traction roller 37, and the like can be adjusted based on the magnitude of the tension fed back by the tension roller 38, thus ensuring smooth conveying of the substrate 40, ensuring stable coating and rolling processes for the substrate 40, and improving the quality of finished products.

In addition, for example, as shown in FIG. 5, the device 30 further includes at least one passing roller 39 disposed between the unwinding roller 361 and the first coating apparatus 31 and/or between the winding roller 362 and the rolling apparatus 33. The passing roller 39 is configured to change a conveying direction of the substrate 40. A position of the passing roller 39 may be arranged according to requirements of the roller system, so as to optimize the structure of the device 30 by changing the conveying direction of the substrate 40.

The number and position of the passing roller 39 are not limited in this application. In FIG. 5, two passing rollers 39 being disposed between the unwinding roller 361 and the first coating apparatus 31 and two passing rollers 39 being disposed between the winding roller 362 and the rolling apparatus 33 are used as an example.

The foregoing describes the substrate processing device 30 in the embodiments of this application. The following describes a substrate processing method 100 in the embodiments of this application. For those not described in detail, refer to the foregoing embodiments. The method 100 is applied to a substrate processing device 30. The substrate processing device 30 includes at least one feeding apparatus and at least one coating apparatus. The feeding apparatus may be, for example, the feeding apparatus 60 according to any one of the foregoing embodiments. The method 100 includes: supplying, by at least one feeding apparatus 60, a material to at least one coating apparatus; and applying, by the at least one coating apparatus, the material 50 onto a substrate 40.

In an embodiment, the at least one feeding apparatus 60 includes a first feeding apparatus 601, and the at least one coating apparatus includes a first coating apparatus 31. The feeding apparatus supplying the material to the coating apparatus includes: the first feeding apparatus 601 dropping the material 50 to a first surface 41 of the substrate 40, where the first surface 41 is perpendicular to a thickness direction of the substrate 40. The coating apparatus applying the material 50 supplied by the feeding apparatus onto the substrate 40 includes: the first coating apparatus 31 applying the material 50 dropped by the first feeding apparatus 601 onto the first surface 41, where the material is used to form a first film material 51 on the first surface.

In an embodiment, the first coating apparatus 31 includes a first coating roller 311 and a second coating roller 312, where the first coating roller 311 corresponds to a discharging outlet of the first feeding apparatus 601, and the second coating roller 312 is disposed opposite the first coating roller 311. The coating apparatus applying the material 50 supplied by the feeding apparatus onto the substrate 40 includes: controlling the substrate 40 to pass between the first coating roller 311 and the second coating roller 312 so as to apply the material 50 dropped through a discharging outlet of the first feeding apparatus 601 onto the first surface 41, where the first surface 41 faces toward the discharging outlet of the first feeding apparatus 601.

In an embodiment, the device 30 further includes a first heating apparatus 34 disposed downstream of the first coating apparatus 31, and the method 100 further includes: heating up, by the first heating apparatus 34, the material 50 coated on the first surface 41, so as to form a first film material 51.

In an embodiment, the at least one feeding apparatus includes a second feeding apparatus 602, and the at least one coating apparatus includes a second coating apparatus 32 and a rolling apparatus 33, where the rolling apparatus 33 is disposed downstream of the second coating apparatus 32, and the rolling apparatus 33 includes a first pressing roller 331 and a second pressing roller 332 disposed opposite each other. The feeding apparatus supplying the material to the coating apparatus includes: dropping, by the second feeding apparatus 602, the material 50 to a roller surface of the first pressing roller 331. The coating apparatus applying the material 50 supplied by the feeding apparatus onto the substrate 40 includes: applying, by the second coating apparatus 32, the material 50 dropped by the second feeding apparatus 602 onto the roller surface of the first pressing roller 331, where the material is used to form a second film material 52 on the roller surface of the first pressing roller 331; and controlling the substrate 40 to pass between the first pressing roller 331 and the second pressing roller 332 so as to transfer the second film material 52 from the roller surface of the first pressing roller 331 and press-fit the second film material 52 onto a second surface 42 of the substrate 40 under a pressure between the first pressing roller 331 and the second pressing roller 332, where the second surface 42 is perpendicular to a thickness direction of the substrate and disposed opposite the first surface 41, the first surface 41 faces toward a roller surface of the second pressing roller 332, and the second surface 42 faces away from the roller surface of the second pressing roller 332.

In an embodiment, the controlling the substrate 40 to pass between the first pressing roller 331 and the second pressing roller 332 includes: conveying, by the second pressing roller 332, the substrate 40 to between the first pressing roller 331 and the second pressing roller 332.

In an embodiment, the device 30 further includes a second heating apparatus 35, and the method 100 further includes: heating up, by the second heating apparatus 35, the material 50 coated on the roller surface of the first pressing roller 331, so as to form a second film material 52.

In an embodiment, the second heating apparatus 35 includes a plurality of heating pipes 351 arranged in an arc shape around the roller surface of the first pressing roller 331.

In an embodiment, the second coating apparatus 32 includes a third coating roller 321 corresponding to a discharging outlet of the second feeding apparatus 602 and disposed opposite the first pressing roller 331. The applying, by the second coating apparatus 32, the material 50 dropped by the second feeding apparatus 602 onto the roller surface of the first pressing roller 331 includes: controlling the first pressing roller 331 and the third coating roller 321 to rotate relative to each other, so as to apply the material 50 dropped through the discharging outlet of the second feeding apparatus 602 onto the roller surface of the first pressing roller 331.

In an embodiment, the rolling apparatus 33 is disposed downstream of the first coating apparatus 31, and the method 100 further includes: controlling the substrate 40 to pass between the first pressing roller 331 and the second pressing roller 332 so as to press-fit the first film material 51 onto the first surface 41 under the pressure between the first pressing roller 331 and the second pressing roller 332.

In an embodiment, the device 30 further includes an unwinding roller 361, a traction roller 37, a winding roller 362, and a tension roller 38, where the traction roller 37 is disposed between the first coating apparatus 31 and the unwinding roller 361, and the tension roller 38 is disposed between the first coating apparatus 31 and the unwinding roller 361. The method 100 further includes: releasing, by the unwinding roller 361, the substrate 40 that is not processed; providing, by the traction roller 37, traction for conveying the substrate 40; winding, by the winding roller 362, the substrate 40 processed by the rolling apparatus 33; and measuring, by the tension roller 38, tension of the substrate 40 in a conveying process, where the tension is used for adjusting a rotation speed of at least one of the unwinding roller 361, the winding roller 362, and the traction roller 37.

It can be seen that based on the feeding apparatus and substrate processing scheme in this application, the feeding apparatus makes the material fall through mechanical vibration, which improves the falling consistency of the material and allows for more even coating of the substrate in the substrate processing, thereby obtaining electrode plates with uniform thickness and flat surface and improving quality of the electrode plates.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A feeding apparatus, characterized in that the feeding apparatus is configured to supply a material for a coating process of a substrate so that the substrate coated with the material becomes an electrode plate; and the feeding apparatus comprises:

a material conveying channel, wherein the material conveying channel comprises a feeding inlet and a discharging outlet, the feeding inlet is closer to a first end of the material conveying channel than the discharging outlet, and the discharging outlet is closer to a second end of the material conveying channel than the feeding inlet, the first end and the second end being two opposite ends of the material conveying channel;

a vibration generator disposed at the material conveying channel, wherein the vibration generator is configured to generate mechanical vibration to induce the mechanical vibration of the feeding apparatus, and the material entering the material conveying channel through the feeding inlet is conveyed to the discharging outlet under action of the mechanical vibration and falls out of the feeding apparatus through the discharging outlet under the action of gravity, a hopper, wherein an outlet of the hopper is connected to the feeding inlet so that the material is added to the material conveying channel through the hopper; and a baffle plate, wherein a thickness direction of the baffle plate is perpendicular to the direction of gravity, the baffle plate is disposed in a region around the discharging outlet of the material conveying channel, and the baffle plate is configured to block the material falling through the discharging outlet, wherein an included angle between an amplitude direction of the mechanical vibration and the direction of gravity and an included angle between the amplitude direction of the mechanical vibration and a forward horizontal direction from the feeding inlet to the discharging outlet are both acute angles, wherein the forward horizontal direction is perpendicular to the direction of gravity.

2. The feeding apparatus according to claim 1, characterized in that a value range of an included angle between an amplitude direction of the mechanical vibration and the direction of gravity is [20°, 70°].

3. The feeding apparatus according to claim 1, characterized in that the vibration generator is a pulse electromagnet.

4. The feeding apparatus according to claim 1, characterized in that the material conveying channel is a cuboid, the feeding inlet is located at a third end of the material conveying channel, and the discharging outlet is located at a fourth end of the material conveying channel, wherein the third end and the fourth end are two opposite ends of the material conveying channel, and both the third end and the fourth end are configured to connect the first end and the second end.

5. The feeding apparatus according to claim 1, characterized in that the material conveying channel is a cylinder, the first end and the second end are two bottom surfaces of the cylinder, and the feeding inlet and the discharging outlet are both located on a side surface of the cylinder.

6. A substrate processing device, characterized by comprising:

at least one feeding apparatus comprising the feeding apparatus according to claim 1; and at least one coating apparatus configured to apply a material supplied by the feeding apparatus onto a substrate.

7. The device according to claim 6, characterized in that the at least one feeding apparatus comprises a first feeding apparatus, wherein the first feeding apparatus is configured to drop the material onto a first surface of the substrate, the first surface being perpendicular to a thickness direction of the substrate; and the at least one coating apparatus comprises:

a first coating apparatus configured to apply the material dropped by the first feeding apparatus onto the first surface, wherein the material is used to form a first film material on the first surface.

8. The device according to claim 7, characterized in that the first coating apparatus comprises:

a first coating roller corresponding to a discharging outlet of the first feeding apparatus; and a second coating roller disposed opposite the first coating roller to apply the material dropped through the discharging outlet of the first feeding apparatus onto the first surface when the substrate passes between the first coating roller and the second coating roller, wherein the first surface faces toward the discharging outlet of the first feeding apparatus.

9. The device according to claim 7, characterized in that the device further comprises:

a first heating apparatus disposed downstream of the first coating apparatus, wherein the first heating apparatus is configured to heat up the material coated on the first surface, so as to obtain the first film material.

10. The device according to claim 7, characterized in that the at least one feeding apparatus comprises a second feeding apparatus, wherein the second feeding apparatus is configured to drop the material onto a roller surface of a first pressing roller; and the at least one coating apparatus comprises:

a second coating apparatus configured to apply the material dropped by the second feeding apparatus onto the roller surface of the first pressing roller, wherein the material is used to form a second film material on the roller surface of the first pressing roller; and a rolling apparatus disposed downstream of the second coating apparatus, wherein the rolling apparatus comprises the first pressing roller and a second pressing roller disposed opposite each other; and the rolling apparatus is configured to: when the substrate passes between the first pressing roller and the second pressing roller, transfer the second film material from the roller surface of the first pressing roller and press-fit the second film material onto a second surface of the substrate under a pressure between the first pressing roller and the second pressing roller, wherein the second surface is perpendicular to a thickness direction of the substrate and disposed opposite a first surface, the first surface faces toward a roller surface of the second pressing roller, and the second surface faces away from the roller surface of the second pressing roller.

11. The device according to claim 10, characterized in that the rolling apparatus is configured to convey the substrate to between the first pressing roller and the second pressing roller using the second pressing roller.

12. The device according to claim 10, characterized in that the device further comprises:

a second heating apparatus configured to heat up the material coated on the roller surface of the first pressing roller, so as to obtain the second film material.

13. The device according to claim 12, characterized in that the second heating apparatus comprises:

a plurality of heating pipes arranged in an arc shape around the roller surface of the first pressing roller.

14. The device according to claim 10, characterized in that the second coating apparatus comprises:

a third coating roller corresponding to a discharging outlet of the second feeding apparatus and disposed opposite the first pressing roller to apply the material dropped through the discharging outlet of the second feeding apparatus onto the roller surface of the first pressing roller when the first pressing roller and the third coating roller rotate relative to each other.

15. The device according to claim 10, characterized in that the rolling apparatus is disposed downstream of the first coating apparatus, and the rolling apparatus is further configured to: when the substrate passes between the first pressing roller and the second pressing roller, press-fit a first film material onto the first surface under the pressure between the first pressing roller and the second pressing roller.

16. The device according to claim 15, characterized in that the device further comprises:

an unwinding roller configured to release the substrate that is not processed;

a traction roller disposed between the first coating apparatus and the unwinding roller and configured to provide traction for conveying the substrate;

a winding roller configured to wind the substrate processed by the rolling apparatus; and a tension roller disposed between the first coating apparatus and the unwinding roller and configured to measure tension of the substrate in a conveying process, wherein the tension is used for adjusting a rotation speed of at least one of the unwinding roller, the winding roller, and the traction roller.

* * * * *